(12) United States Patent
Gendron

(10) Patent No.: US 7,224,707 B2
(45) Date of Patent: May 29, 2007

(54) SUPPRESSION OF MODE-BEATING NOISE IN A Q-SWITCHED PULSED LASER USING NOVEL Q-SWITCH DEVICE AND APPLICATIONS

(76) Inventor: Denis J. Gendron, 162 Daimler Drive, Kitchener, Ontario (CA) N2A 4C7

( * ) Notice: Subject to any disclaimer, the term of this patent is extended or adjusted under 35 U.S.C. 154(b) by 153 days.

(21) Appl. No.: 10/792,782

(22) Filed: Mar. 5, 2004

(65) Prior Publication Data

US 2005/0213617 A1 Sep. 29, 2005

Related U.S. Application Data

(63) Continuation-in-part of application No. 10/487,473, filed as application No. PCT/CA02/001285 on Aug. 20, 2002, now abandoned.

(60) Provisional application No. 60/314,204, filed on Aug. 21, 2001.

(51) Int. Cl.
*H01S 3/11* (2006.01)
*H01S 3/16* (2006.01)

(52) U.S. Cl. .......................... 372/10; 372/41

(58) Field of Classification Search ................. 372/10, 372/41

See application file for complete search history.

(56) References Cited

U.S. PATENT DOCUMENTS 5,673,281 A * 9/1997 Byer .............................. 372/3
5,905,746 A * 5/1999 Nguyen et al. ............... 372/12

(Continued)

OTHER PUBLICATIONS

Bernard J.E. et al., "High-Repetition-Rate Diode-Pumped ND:YV04 Slab Laser", Optics Letters, Optical Society of America, Washington, US, vol. 19, No. 22, Nov. 15, 1994, p. 1861-1863.

Bouma B. et al., "Hybrid Mode Locking of a Flash-Lamp-Pumped TI:AL203 Laser", Optics Letters, Optical Society of America, Washington, US, vol. 19, No. 22, Nov. 15, 1994, p. 1858-1860.

*Primary Examiner*—Minsun Oh Harvey
*Assistant Examiner*—Marcia Golub

(57) ABSTRACT

A novel Q-switch device enables significant quality and value improvement for a Q-switched laser system by achieving a significant reduction of mode-beating noise during the pulsed output. The origin of mode-beating noise in a Q-switched laser is a result of high gain availability and amplification of competing standing-waves in formation, whose optical frequency is a product of natural selection via spatial hole burning in the gain medium. The novel Q-switch device employs an active, electro-optics or acousto-optics, Q-switch in combination with a saturable absorber device, to provide an optimized soft opening of the optical path and a controlled timing of a Q-switched laser. This novel combination offers larger modulation loss than otherwise possible with the active modulator alone, and it allows for higher gain build-up and energy extraction efficiency. Specifically, it will enable a low-voltage modulator (<100 V) for high gain (small-signal gain>10) and Q-switched operation at high repetition rate (>10 kHz). The combination is devised to slow down the signal build-up and to sweep the fundamental longitudinal mode frequency at least within the free spectral range of the resonator, such that it varies adiabatically during the Q-switched pulse formation. A laser geometry amenable to high gain and high power is proposed for use in conjunction with the proposed novel Q-switch device. The invention will enable the deployment of cost-effective Q-switched lasers operating in both single-longitudinal and single-transverse ($TEM_{00}$) mode.

23 Claims, 5 Drawing Sheets

U.S. PATENT DOCUMENTS 6,252,892 B1 * 6/2001 Jiang et al. .................. 372/11
6,263,004 B1   7/2001 Arvidsson et al.
6,795,198 B1 * 9/2004 Fuchs et al. ................ 356/521

* cited by examiner

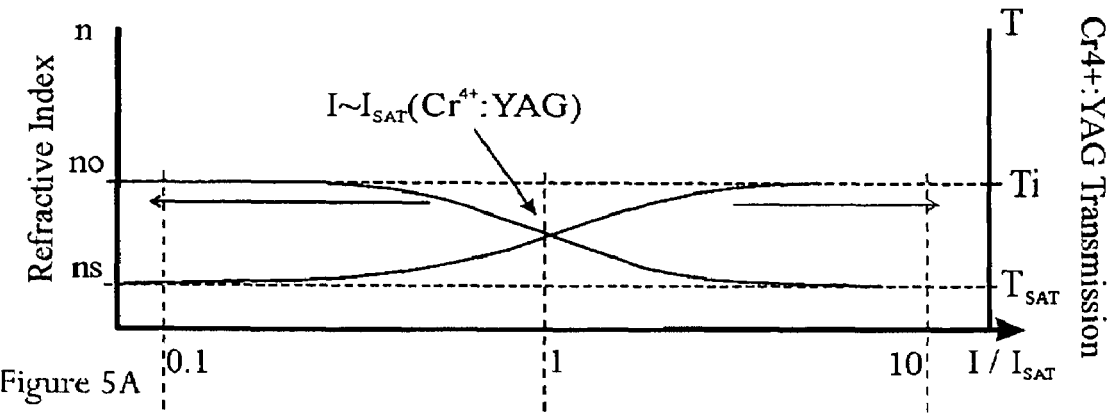
Figure 5A.
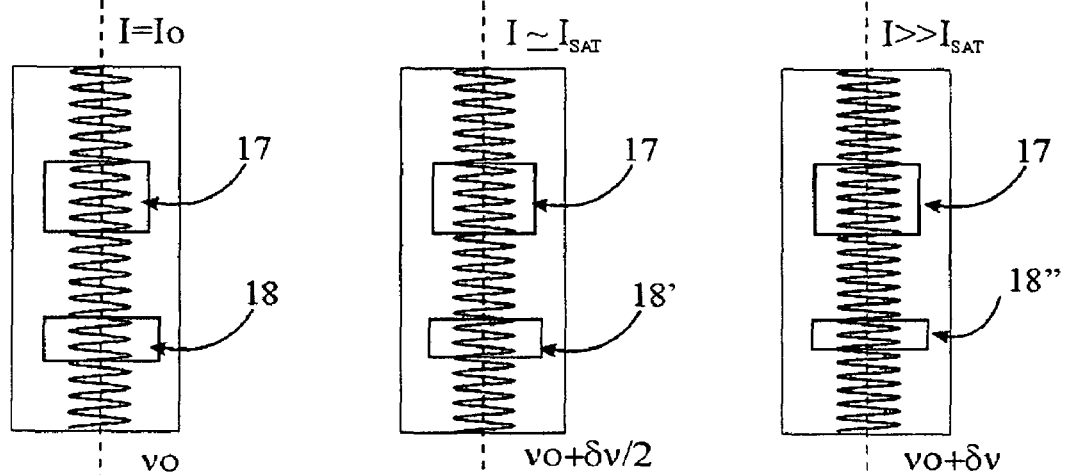
Figure 5B.
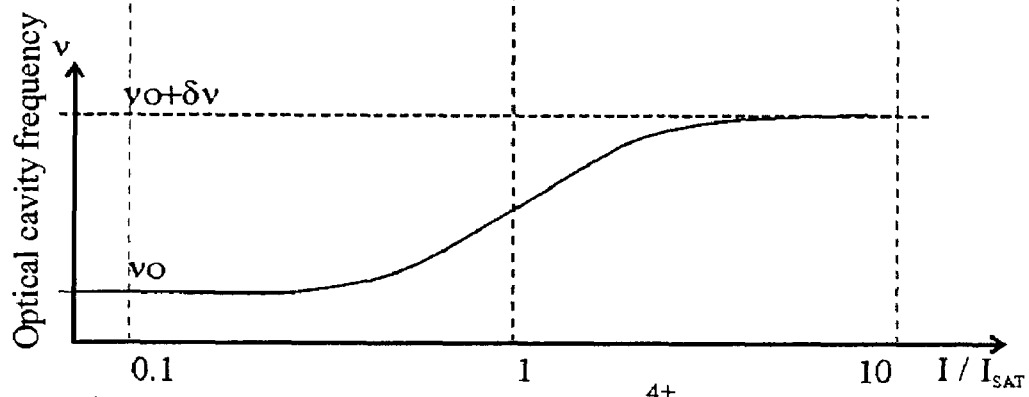
Figure 5C. Intracavity intensity on $Cr^{4+}$:YAG

SUPPRESSION OF MODE-BEATING NOISE IN A Q-SWITCHED PULSED LASER USING NOVEL Q-SWITCH DEVICE AND APPLICATIONS

CROSS REFERENCE TO RELATED APPLICATION

This application is a continuation-in-part of U.S. application Ser. No. 10/487,473, filed Aug. 20, 2002 now abandoned (which U.S. application is a national phase entry of international application No. PCT/CA2002/001285) filing date Aug. 20, 2002 which, in turn, claims priority from U.S. provisional application No. 60/314,204, filed Aug. 21, 2001.

BACKGROUND OF THE INVENTION

1. Field of the Invention

The present invention relates to a Q-switched device and to Q-switched lasers, such as a scalable side-pumped laser for lidar, medical and other applications. The proposed device can enable cost-effective near single-mode operation with a smooth temporal profile and a slightly chirped spectral profile.

2. Description of the Related Art

Siegman explained in his monograph entitled Lasers (Anthony E. Siegman, Stanford University, Lasers, University Science Books, 1986, ISBN 0-935702-11-3) that Q-switched (QS) lasers are more likely to oscillate in several axial and/or transverse modes than are continuous-wave (cw) or long-pulse lasers. The details of laser dynamics are further discussed later in this document, but the oscillation essentially results from the generation of a few laser cavity modes with closely spaced respectively frequencies. Modes usually compete for the high gain during the pulse of a typical QS laser. The interference between these modes, also referred to as mode-beating, results in spikes, or intensity modulations at frequencies higher than the pulse envelope. These spikes are detrimental to the long-term reliability of practical lasers (output above a few watts), because they lead to a lower damage threshold and/or reduced lifetime for optical devices downstream of the optical train, such as nonlinear optical devices or fiber optic delivery systems. Moreover, these spikes can be highly problematic for numerous applications such as limiting the lifetime or efficiency of high power nonlinear optics conversion processes, limiting resolution or noise of lidar metrology, or limiting narrow-band laser applications such as ranged spectroscopic species identification.

Known systems (e.g., U.S. Pat. No. 4,455,657 to Robert. L. Byer) address the problem of controlling QS pulsed laser and single-longitudinal-mode operation to minimize the mode-beating noise effect. These known systems are based on an external seed-injection laser. The significance of the proposed technique is best illustrated by comparison to this known technique.

The seed-injection technique is based on the use of a single-longitudinal mode laser (the seed laser), maintained at a fixed frequency, and injected in the main QS oscillator cavity to dominate the initial stimulated emission process during the pulse build-up, as opposed to leaving random spontaneous emission to create the signal by default. The method works well, but is relatively cumbersome, expensive, and the alignment is sensitive and it is labor-intensive. Moreover, electronic control feedback is required to stabilize the oscillator cavity length, and to match the frequency of the seed laser.

By contrast, the novel Q-switch device described herein requires no additional external feedback, and does not add significant complexity to the usual QS laser cavity. Its implementation does not add significant cost to a regular QS laser to produce narrow-band spectral emission via operation with single or near-single longitudinal mode (SLM). With proper precautions in the design and implementation of the invention, an economical QS laser with single-transverse ($TEM_{00}$) can be produced.

SUMMARY OF THE INVENTION

In accordance with an aspect of the present invention there is provided a Q-switched solid state laser comprising: a laser material in a resonant optical cavity; and a Q-switched device comprising an active modulator capable of producing optical loss at a controlled rate and a saturable absorber within said resonant optical cavity selected and arranged such that a change in refractive index of said saturable absorber during pulse rise time multiplied by the length of the saturable absorber has a value at least that of one-quarter of the wavelength of the fundamental mode.

Other features and advantages of the invention will be apparent after a review of the following description in conjunction with the drawings.

BRIEF DESCRIPTION OF THE DRAWINGS

FIGS. 5A, 5B and 5C illustrates various physical aspects of absorption saturation in the novel Q-switch device during a QS laser pulse. FIG. 5A is a graph of refractive index and transmission versus intracavity intensity incident on a $Cr^{4+}$:YAG saturable absorber used as an example. The intracavity intensity ranges a few orders of magnitude during a QS pulse, and it is assumed that $I \sim I_{SAT}$ somewhere along the QS pulse rise time. FIG. 5B schematically illustrates how the change of the intracavity optical path, due to small refraction changes in the saturable absorber, results in the change of cavity fundamental mode frequency represented in FIG. 5C.

DETAILED DESCRIPTION

Figure 1:
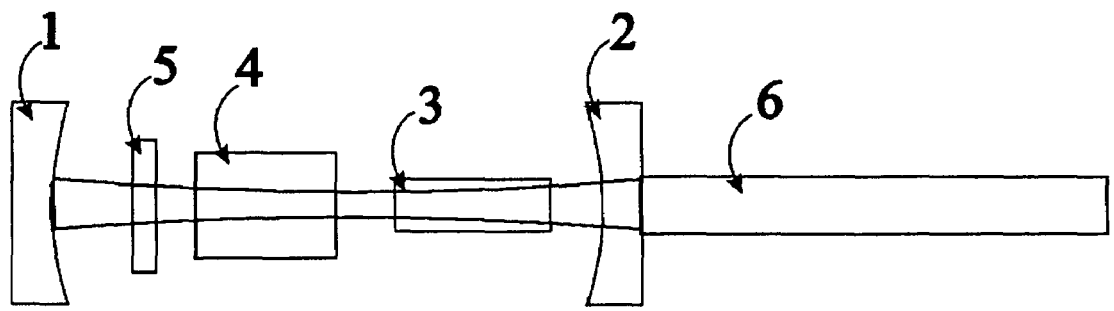
FIG. 1 is a schematic view of one possible implementation of a QS laser with a Q-switch device in accordance with this invention in a linear cavity.

The principle of the proposed device is based on (i) an active Q-switch (Electro-Optics or Acousto-Optics Modulator device) that provides a high-contrast of modulation loss for high-energy storage and high-gain in the lasing medium, and (ii) a saturable absorber that contributes to further loss contrast and that slows down the initial signal build-up of the lasing mode, effectively providing a soft switching of the laser cavity. When the active part of the novel QS device opens, the initial cavity gain is maintained low enough by the linear unsaturated absorption of the saturable absorber so as to encourage the operation of the cavity fundamental transverse mode and single longitudinal mode and to help this initial mode dominate the laser emission, if the laser is designed to support primarily $TEM_{00}$.

Moreover (iii) the device can exploit a small nonlinear behavior of the dispersion during saturation of the absorber, which for appropriate design will result in a frequency chirp during the process of absorber saturation. This small nonlinear behavior results in a minute change of refractive index, for a relatively large change of absorption during saturation. The minute change of refractive index translates into a minute change of the single longitudinal mode (SLM) cavity resonant frequency.

The novel QS device may be designed for a given specific QS laser application in such a way that the saturable absorber experiences changes of intracavity intensities around the value of $I_{SAT}$ during first half of the rise time in QS pulse formation. As this occurs, the small dynamic change of refractive index due to the nonlinearity of absorption saturation will translate into a small dynamic change of intracavity mode frequency, i.e. a frequency chirp. For appropriate values of the system parameters and the proposed novel Q-switch, the frequency chirp of the fundamental mode will be a few times the free-spectral-range of the laser resonator. Such frequency chirp during pulse onset greatly reduces mode-beating noise and can ultimately alleviate it. Ideally, the device will allow a single longitudinal mode to exist in the cavity, while the single frequency of that mode would vary during the absorber saturation. This mode of operation is enabled in part by a nonlinear dispersion effect (refractive index change) that occurs in the absorber during saturation. This can enhance the extraction efficiency of the energy stored in the gain medium by avoiding the spatial hole burning mechanism.

An embodiment of the proposed invention could be the combination of an acousto-optics active modulator with a $Cr^{4+}$:YAG saturable absorber as an application of the novel Q-switch device, and a $Nd^{3+}$:YAG crystal pumped by a diode laser array as a laser gain medium.

Heeding additional cautions will ensure optimal performance when using this novel Q-switch device. For example, the saturation level should be selected to be not too high, because it has been shown that a bleaching of the excited state absorption can occur in some instances, in addition to the ground-state absorption saturation expected by the design. Such observations were reported by Jie Song, Cheng Li, Nam Seong Kim, and Ken-ichi Ueda, Applied Optics, Vol. 39, No. 27 (2000). In terms of time-domain analysis, one must note that the relaxation time constant for the excited state directly populated from the ground state is a few microseconds for $Cr^{4+}$:YAG. However the second excited state (excited by absorption from the excited state) has a lifetime of only a few nanoseconds. Hence this fast response time could support mode-locking. The boundary between mode-beating during gain switching, and mode-locking is not a sharp one. Rather, it is a continuous transition. Therefore, too much intensity on the saturable absorber could also possibly enhance the mode-beating noise by pushing the laser into mode-locked Q-switching operation. Thus an optimum range of intensity exists for best operating performance, which is a function of the specific gain medium and saturable absorber material.

FIG. 1 illustrates elements of an example pulsed laser oscillator having a novel Q-switch device for the suppression of mode-beating noise. The example pulsed laser system is based on a linear resonator cavity design and comprises: a high reflecting back mirror 1, a partially reflecting output coupler 2, an amplifying laser material 3 and a soft switch consisting of an active Q-switch 4 (and its electronic driver not shown) and a saturable absorber 5. The pulsed laser output 6 consists of smooth pulse with a Fourier-Transform-Limited pulse envelope.

Figure 2A:
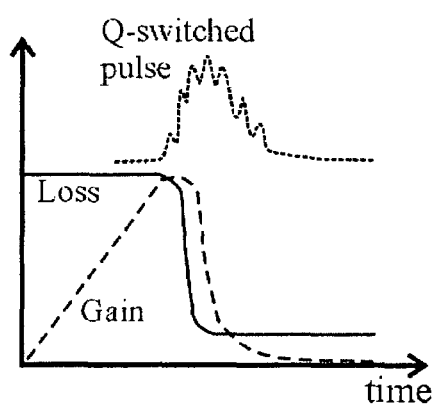
FIGS. 2A and 2B are graphs of gain, loss and resulting pulse output versus time illustrating the formation of a Q-switched pulse in a typical QS laser oscillator, respectively without and with soft switching for the suppression of mode-beating noise.
Figure 2B:
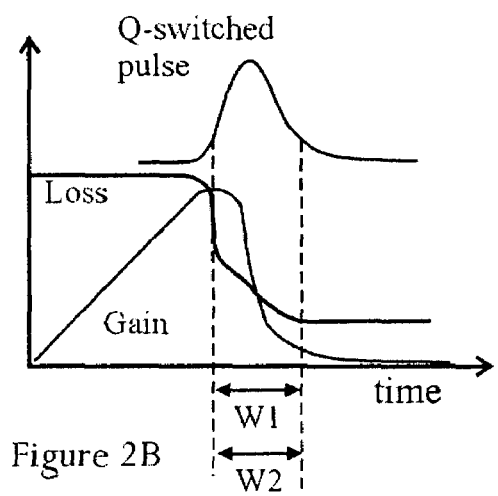

The actual net dynamic gain in the pulsed laser results from the difference between the dynamic gain and losses in the laser resonator. FIG. 2A illustrates the formation of Q-switched pulses in a typical Q-switch laser, without additional means to stabilize pulse output. FIG. 2B illustrates the comparison using the proposed novel Q-switched laser of this invention. In FIG. 2A, the losses are suddenly switched off and this effect is amplified by the high gain; a type of ringing modulation results, in terms of this simplified time-based explanation. In FIG. 2B, the novel Q-switch device minimizes the brutal switch-off of the loss by slowing down the process via the addition of saturable losses "in parallel" with the active switch. The effect may be comparable to the optimum matching of impedance for power transfer in electronic circuits. The advantages of the invention are made explicit in FIGS. 2A, 2B: reduction of spiking noise, hence a higher quality laser. This is achieved without the use of the more complex "traditional" technique of external single-mode laser injection. Please note the spiky pulse from the typical Q-switch laser compared to the smooth temporal pulse produced by the Q-switched laser made in accordance with this invention.

Figure 3A:
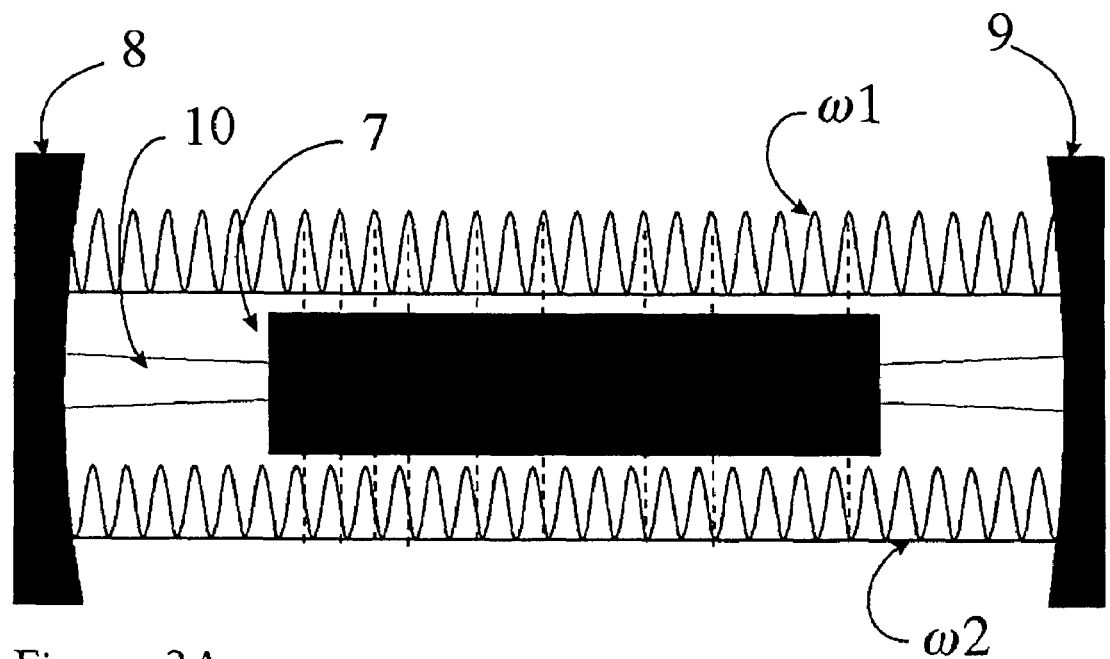
FIG. 3A is a schematic view of a laser showing how the gain volume is not extracted efficiently by the first longitudinal mode crossing the lasing threshold. The physical situation that there are periodic regions where stored energy has been first depleted due to initially more efficient extraction by the first longitudinal mode $\omega 1$ crossing the lasing threshold is referred to as spatial hole burning. The periodicity of the remaining region with non-extracted gain gives rise to a strong secondary mode $\omega 2$, with a well-defined phase relation, or coherence, with respect to the initial $\omega 1$ mode.

The origin of mode-beating noise in a Q-switched laser is a result of high gain availability and amplification of competing standing-wave formations, whose optical frequency is a product of natural selection via spatial hole burning in the gain medium. FIG. 3A illustrates spatial hole burning in a laser, and how two closely spaced coherent frequencies $\omega1$ and $\omega2$ are produced. As will be appreciated by those skilled in the art, the term "spatial hole burning" refers to the effect of the first mode $\omega1$ not removing all of the stored energy in periodic regions of the gain medium. At first, frequency $\omega1$ grows from spontaneous emission and establishes itself as the dominant longitudinal mode in the cavity. Then a second mode $\omega2$ starts to grow, and its frequency is defined by a best spatial overlap with the remaining gain, within the maximum gain of the medium spectral bandwidth. This is how two closely spaced coherent frequencies are produced.

Figure 3B:
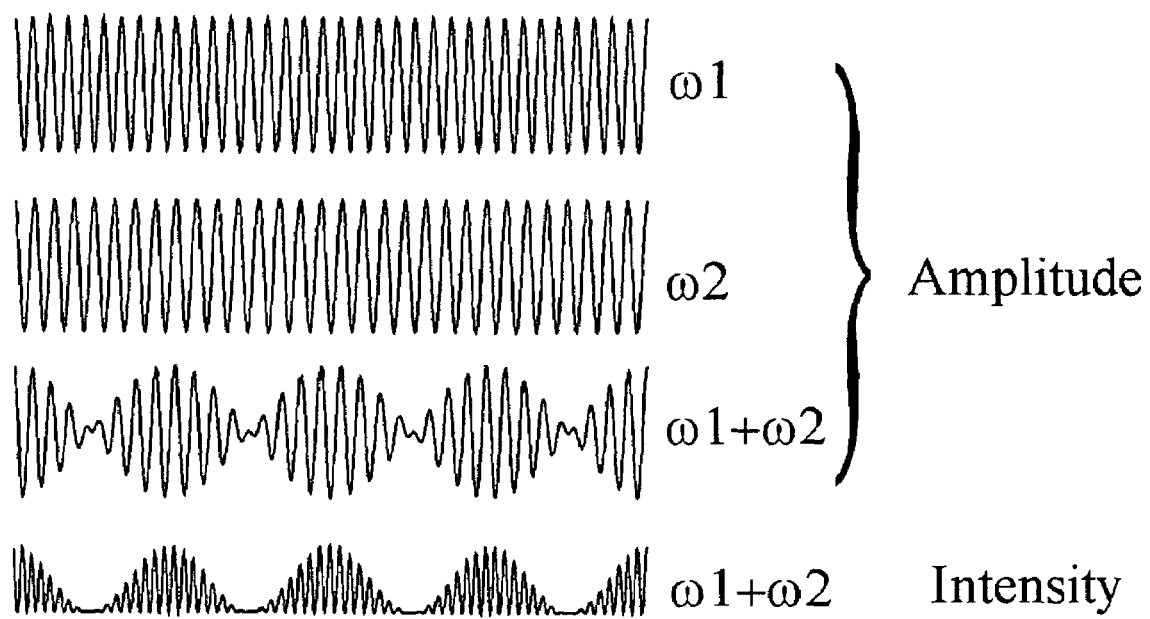
FIG. 3B illustrates how the two signal amplitudes of mutually coherent modes $\omega 1$ and $\omega 2$ interfere and produce mode-beating noise.

In FIG. 3B, two coherent amplitudes having closely spaced frequencies $\omega1$ and $\omega2$ interfere to produced the intensity of the summed modes: this illustrate how two coherent modes results in amplitude fluctuation, or noise—referred to as "mode beating" in the field of laser science. Note that the optical carriers are not detected directly in practice, and only the envelope is detected, as the mode spacing is much smaller than the carrier; the figure shows an unrealistic ratio of frequencies for the clarity of the illustration.

Figure 4:
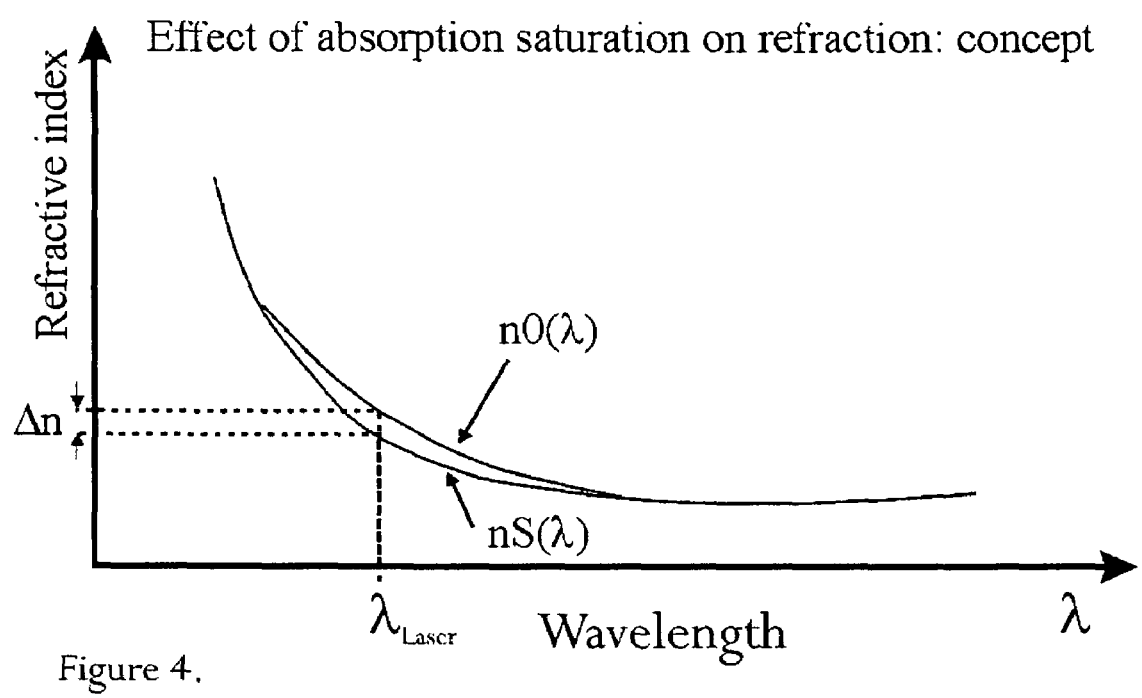
FIG. 4 is a graph of refractive index versus wavelength illustrating the small change of refractive index in a saturable absorber material, for the two extreme cases of a small signal and fully saturated propagation. The parameter $\Delta n$ is defined as: $\Delta n = n0 - nS$; $n0$ is the small-signal refractive index, while $nS$ is the saturated refractive index. The relative value of $\Delta n$ is exaggerated for the clarity of the drawing; typical values of $\Delta n/n0$ are of the order of 1 E-4 to 1E-3.

A subtle point that may be exploited by this invention and overlooked by most in the field of laser science is the existence of a small non-linearity of the refractive index that accompanies the absorption saturation dynamics. FIG. 4 illustrates the small change of refractive index in saturable absorber material, for the two extreme cases of (i) small signal propagation represented by the curve labeled n0(λ), and (ii) fully saturated propagation represented by the curve labeled nS(λ). Note that the relative change of refractive index, Δn/n0, is very small, and typically around the order of magnitude 1E-4 to 1E-3; Δn=nS-n0, where n0 is the small signal propagation index, and nS is the saturated propagation index. Consequently, a device thickness of 1-10 mm can produce a change of optical path sufficient to alleviate the hole burning effect, and provide a smoothly varying chirp of narrow frequency resulting in a smooth temporal pulse output.

As will be appreciated by those skilled in the art, the saturable absorber parameters, the gain medium and the laser cavity parameters are best chosen in such a way as to ensure the fastest change of transmission (proper saturation) of the saturable absorber during the rise time of the Q-switched pulse. This will ensure that the dynamic frequency change of the dominant single-mode during the most efficient part of the energy extraction process, hence a smooth pulse output. This effectively will result in a scan of the mode frequency wide enough to avoid spatial hole burning.

The explanations come together in the operation of the novel Q-switch device, illustrated in FIGS. 5A to 5C. FIG. 5A illustrates how the novel Q-switch works. As the active modulator (not shown here) opens, the stimulated emission builds up, and the intracavity intensity increases exponentially. As the intracavity intensity builds up by successive pass in the gain medium 17, the intensity incident on the saturable absorber 18 approaches $I_{SAT}$(Cr:YAG): transmission increases from $T_0$ to $T_{SAT}$ and the refractive indices decreases from $n_0$ to $n_{SAT}$. The gain density in the gain medium 17 and optical density of the saturable absorber 18 should be selected for the pulse rise time to correspond to the maximum rate of saturation in the saturable absorber. This will insure that the concurrent frequency chirp of the optical radiation will occur during the critical time for gain extraction, hence avoiding spatial hole burning.

FIG. 5B illustrates how the frequency chirp results from absorber saturation. During saturation, the optical path of the saturable absorber shortens (as illustrated by the notional foreshortened saturable absorbers 18' and 18") as a result of a small decrease of refractive index Δn. FIG. 5C illustrates how the longitudinal cavity modes have their frequencies adiabatically shifted from lower to higher spatial frequencies during each pulse. For many micromachining applications, this is of no consequence. This chirped Q-switched pulse may have numerous applications, notably in Raman pulse compression techniques and in lidar applications. This actual frequency chirp (small shift in frequency) occurs parametrically during the laser pulse, as the pulse intensity varies through the range of saturation intensity in the saturable absorber material.

As aforestated, a frequency chirp of the fundamental mode during pulse formation that is a few times the free-spectral range of the laser resonator greatly reduces mode beating noise in Q-switched lasers. This requirement may be more formally stated as:

$$\Delta v_{CAV} > 0.5 v_{FSR}$$

where $v_{CAV}$ is the frequency of the fundamental mode and $v_{FSR}$ is the free spectral range.

As will be shown hereinbelow, this is equivalent to stating that the length of the optical resonant cavity ($L_{CAV}$) changes by at least one-quarter of the wavelength (λ) of the fundamental mode. Since the change in the cavity length is a function of the change in the index of refraction (n) of the saturable absorber, we wish to show that the required frequency chirp is achieved if:

$$\Delta L_{CAV} = \Delta n * L_{SA} > \lambda/4$$

where
Δn=$n_0$-$n_s$ ($n_0$ being the small signal dispersion and $n_s$ being the saturated dispersion), and $L_{SA}$ is the length of the saturable absorber.

To show this, it is first noted that the free spectral range ($v_{FSR}$) of the laser cavity is c/(2*$L_{CAV}$), where c is the speed of light. As will be well understood by those skilled in the art:

c=vλ, where v is frequency and λ is wavelength.

For infinitesimal variation around central values the following holds:

$$\Delta v/v = \Delta\lambda/\lambda$$

where Δv represents small variation around v and Δλ represents small variation around λ. The cavity length ($L_{CAV}$) is an integral number of the resonant $\lambda_{CAV}$, thus:

$$L_{CAV} = m * \lambda_{CAV}$$

and the cavity frequency is given by:
$v_{CAV}$=c*m/$L_{CAV}$, where m is a large integer (of the order of 10E4 to 10E6).

Simple differential calculus results in:

$$\delta v_{CAV}/L_{CAV} = -c*m/(L_{CAV}^2)$$
$$= -v_{CAV}/L_{CAV} \text{ (from a simple substitution)}$$

Hence, for infinitesimal variation around central values, we have:

$$\Delta v_{CAV}/v_{CAV} = \Delta L_{CAV}/L_{CAV} = \Delta \lambda_{CAV}/\lambda_{CAV}$$

But recall that:

$$\Delta v_{CAV}/v_{CAV} = \Delta L_{CAV}/L_{CAV} = \Delta L_{CAV}/m*\lambda_{CAV}$$

hence, this implies that:

$$\Delta v_{CAV} = (v_{CAV})(\Delta L_{CAV}/L_{CAV})$$

using simply that Δ $L_{CAV}$>λ/4, one readily obtains:

$$\Delta v_{CAV} > v_{CAV} * (\lambda_{CAV}/4)/L_{CAV}$$

thus:

$$\Delta v_{CAV} > c/(4*L_{CAV})$$

so $$\Delta v_{CAV} > 0.5 v_{FSR}$$

Thus, $\Delta L_{CAV} > \lambda/4$ is consistent with a cavity shift of a few times the free spectral range.

The following provides further guidance for appropriate choices of variables in order to achieve this desired dynamic frequency chirp.

First, as will be recognised by those skilled in the art, where a light pulse builds faster than the relaxation life time of a saturable absorber, the non-linear dynamic absorption saturation of the absorber is characterized by the saturation fluence for absorption, $F_{SAT,ABS}$, which is defined as:

$$F_{SAT,ABS} = h\nu / \sigma_{ABS}(\lambda) \quad \text{(equation I)}$$

where $h\nu$ is the photon energy.

Similarly, for a gain medium, a quantity that characterizes the nonlinear dynamic of gain saturation where the light pulse builds faster than the relaxation of stored energy, is the saturation fluence for the gain medium, $F_{SAT,EM}$, which is defined as:

$$F_{SAT,EM} = h\nu / \sigma_{EM}(\lambda) \quad \text{(equation II)}$$

It will be appreciated that these equations are applicable to the subject Q switched lasers given the fast rise time of the laser pulse.

As is apparent from FIG. 2B, in order to achieve a smooth pulse (i.e., avoid the mode beating noise of FIG. 2A), the time window W1 during which the saturable absorber saturates should substantially overlap with the time window W2 during which the gain medium saturates.

In formal terms, a necessary condition for concurrent saturation of the saturable absorber and the gain medium during formation of Q-switch pulse is that the laser fluence in the gain medium and the saturable absorber approach their respective saturation fluence in parallel.

This condition can be simply written as:

$$F_{ABS}/F_{SAT,ABS} = F_{EM}/F_{SAT,EM} \quad \text{(equation III)}$$

Equation III can be rewritten as:

$$F_{ABS}/F_{EM} = F_{SAT,ABS}/F_{SAT,EM} \quad \text{(equation IV)}$$

The units of fluence are energy/area. Let's assume the first-order approximation of homogeneous time-integrated pulse energy, $E_{INT}$ along the laser cavity, at a given instant. Hence, materials with different saturation fluence can be accommodated by different laser beam areas ($A = \pi \ast w^2$, where w spot radius of laser beam) in each material.

Hence the left side of equation IV can be written as:

$$F_{ABS}/F_{EM} = (E_{INT}/\pi \ast w^2_{ABS})/(E_{INT}/\pi \ast w^2_{EM})$$

which can be simplified to:

$$F_{ABS}/F_{EM} = (w_{EM}/w_{ABS})^2 \quad \text{(equation V)}$$

Referring to equation I and II, one can rewrite the right side of equation IV as:

$$F_{SAT,ABS}/F_{SAT,EM} = (h\nu/\sigma_{ABS}(\lambda))/(h\nu/\sigma_{EM}(\lambda))$$

$$F_{SAT,ABS}/F_{SAT,EM} = \sigma_{EM}(\lambda)/\sigma_{ABS}(\lambda) \quad \text{(equation VI)}$$

where $\lambda$ is the nominal wavelength of the fundamental mode.

The condition for optimum concurrence of saturation process is obtained by substitution of equations V and VI in equation IV, to obtain:

$$(w_{EM}/w_{ABS})^2 = \sigma_{EM}(\lambda)/\sigma_{ABS}(\lambda)$$

or $$w_{EM} = w_{ABS}(\sigma_{EM}(\lambda)/\sigma_{ABS}(\lambda))^{1/2}$$

When this condition is fulfilled, the gain medium and the saturable absorber experience saturation contemporaneously.

It has been recognised that useful pulse smoothing may be obtained even with lower relative depths of saturable absorption. Formally, this may be stated by including an overlap factor, $\mu$, in equation IV, as follows:

$$F_{ABS}/F_{EM} = \mu F_{SAT,ABS}/F_{SAT,EM}$$

It is believed that $\mu$ may vary from unity down to about 0.1 and still result in useful pulse smoothing. Indeed, for the following reasons, in practical systems the value of $\mu$ will normally be chosen to be less than unity, often within the range of 0.1 to 0.4. Each of $F_{EM}/F_{SAT,EM}$ and $F_{ABS}/F_{SAT,ABS}$ (being a ratio of total fluence to saturation fluence) is a measure of depth of saturation. Each such ratio (of $F/F_{SAT}$) is known as a normalized fluence.

Apart from avoiding optical damage, there is no detrimental effect to deep saturation in the gain medium. Nevertheless, energy can be efficiently extracted from the gain medium if the fluence is two to four times the saturation fluence, thus:

$$2 < F_{EM}/F_{SAT,EM} < 4$$

In some cases, there may be a detrimental effect associated with deep saturation in the saturable absorber because the excited state (unsaturable) absorption may contribute significantly to absorption. This potential detrimental effect from significant excited state absorption (deep saturation) is related to the fast (sub-nanosecond time scale) relaxation dynamic typical of some excited state absorption. A device responding to such a fast relaxation dynamic has the tendency to move the laser cavity oscillation today mode-locking, hence enhancing mode-beating noise. In consequence, there is a trade-off in providing sufficient saturation to result in the required significant change in the refractive index of the absorber while minimizing problems associated with deep saturation. This trade-off normally results in a normalised fluence for the absorber of between 0.4 and 0.8, thus:

$$0.4 < F_{ABS}/F_{SAT,ABS} < 0.8.$$

Combining these two equations suggests the following equation for many practical systems:

$$F_{ABS}/F_{EM} = (0.2) F_{SAT,ABS}/F_{SAT,EM}$$

Another consideration which will be understood by a worker skilled in the art is that the saturable absorber crystal must be cut and aligned in the laser cavity in such a way that no depolarization effects will occur. This undesirable situation can occur in two ways:

the crystal is not cut in a proper way to match the eigenstate of laser polarization, for example, in case of Cr4+: YAG crystal, if it is not cut in such a way (100) that linear polarization can address only one symmetry orientation of the (three possible) crystal sites, or the crystal is cut in a proper way, but not aligned properly with respect to the polarization in the laser cavity.

More formally, the occurrence of depolarization effects will occur when the crystal eigenvector is not aligned with the corresponding polarization eigenvector. When this situation occurs, laser polarization interacts with more than one set of absorber sites, and the spatial difference of saturated dispersion results in a (saturation) birefringence. Intracavity laser propagation in birefringence results in laser depolarization and in some cases can lead to mode-locking enhancement, which is a coherent form of high-frequency noise for Q-switched lasers.

In view of the fact that we wish to have $\Delta L_{CAV} = \Delta n * L_{SA} > \lambda/4$, the required length (thickness) of the saturable absorber is dependent upon $\Delta n$. In turn, $\Delta n$ is dependent upon the specific material of the absorber and the depth of saturation. Once $\Delta n$ is known, the length of the saturable absorber may be chosen. This length will often be chosen close to the minimum possible value to avoid unnecessary loses in the laser.

Figure 6:
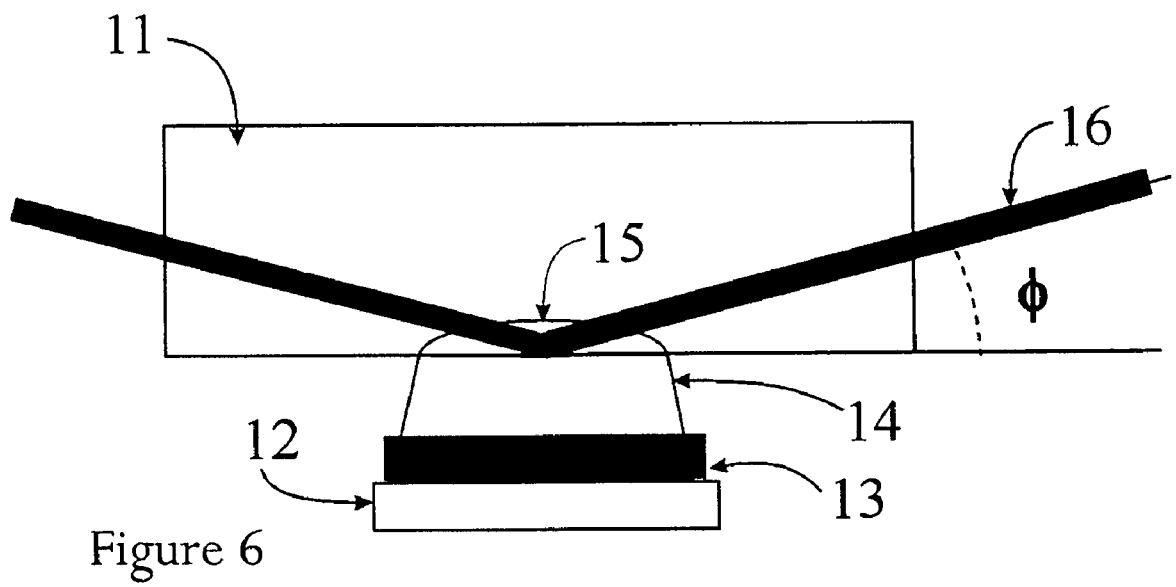
FIG. 6 schematically illustrates a possible embodiment of a gain medium suitable for use in a laser using the novel Q-Switch device of this invention.

FIG. 6 illustrates an example of a gain medium that would be suitable to use in conjunction with the aforedescribed novel Q-switch device. It comprises a solid-state laser material 11 having at least one (polished) flat pumping surface, an optical pumping radiation source 12 (which may be a laser array, laser bar or other suitable optical pump source), and pump beam optics 13. The optics 13 focus the pump beam so that it is convergent upon entering the laser material and manipulates the beam 14 with suitable refractive, diffractive and/or polarization optics to produce a gain medium volume 15 with a height nearly equal to the diameter of the designed laser mode. The focused optical source also has an absorption length perpendicular to the pump surface approximately equal to the radius of the designed laser mode.

The gain medium is an excited laser material in a laser resonator. The gain medium is positioned in the laser resonator such that the optical axis 16 of the laser is folded symmetrically by internal reflection at the center of the pumped surface and the angle between the reflecting beam and the flat pumping surface is greater than 10 degrees and less than 80 degrees. In consequence, the laser beam travels through the region of high gain as it travels through the gain medium and the fold angle is less than 160 degrees. The absorption length and fold angle of the symmetric optical axis in the gain medium are selected such that the transverse gain distribution, integrated along the propagated cavity axis, has nearly circular symmetry.

This gain medium design features the simplicity of a side-pumping design, but it also has the capability to produce a good overlap between the pump mode and laser mode thereby offering pump-beam/laser-beam overlap efficiency comparable to end-pumped designs. The combination of these properties with good pump quality, i.e. stable power and appropriately narrow wavelength, result in a very desirable laser for the application of the described novel Q-switch device.

Another advantage needs to be stipulated here. High gain (a small signal gain greater than 10 fold) is required for a short pulse Q-switched laser (<2 nsec). To hold-off a high gain laser, typical modulators used are Electro-optic modulators (EOMs). EOMs provides the necessary contrast, but require high-voltage (HV) and are limited to a few kilohertz. Acousto-Optics modulators (AOMs) can span a higher range of repetition rate frequencies, but they have limited contrast (typically <10). A significant advantage of the novel Q-switch device is that it also offers the possibility of producing a modulator device capable of switching high gain without HV and doing so at a high repetition rate.

The invention being thus disclosed and representative embodiments thereof described, further variations and modifications will occur to those skilled in the art, and such variations and modifications are considered to be within the scope of the invention, as defined by the claims appended hereto.

What is claimed is:

1. A Q-switched solid state laser comprising:
a laser material in a resonant optical cavity; and
a Q-switched device comprising an active modulator capable of producing optical loss at a controlled rate and a saturable absorber within said resonant optical cavity selected and arranged such that a change in refractive index of said saturable absorber during pulse rise time multiplied by the length of the saturable absorber has a value at least that of one-quarter of the wavelength of the fundamental mode and wherein said saturable absorber is selected such that a ratio of normalized fluence of the absorber to normalized fluence of the gain medium falls with the range of 0.1 to 1.0.

2. The laser of claim 1 wherein said saturable absorber is selected such that a ratio of normalized fluence of the absorber to normalized fluence of the gain medium falls with the range of 0.1 to 0.4.

3. The laser of claim 1 wherein said saturable absorber is selected such that a ratio of normalized fluence of the absorber to normalized fluence of the gain medium is about 0.2.

4. The Q-switched device according to claim 1, wherein said active modulator is an electro-optic modulator.

5. The Q-switched device according to claim 1, wherein said active modulator is an acousto-optic modulator.

6. The Q-switched device of claim 1 wherein said saturable absorber is a Cr4+: YAG.

7. The Q-switched device of claim 1 wherein said active modulator is spaced from said saturable absorber.

8. The Q-switched device of claim 1 wherein said saturable absorber has a thickness of between one to ten millimeters.

9. A Q-switched solid-state laser comprising:
a laser material in a resonant optical cavity;
a Q-switched device comprising an active modulator capable of producing optical loss at a controlled rate and a saturable absorber within said resonant optical cavity selected and arranged so as to, in use, reduce mode-beating noise;
wherein said laser material is side-pumped on a polished flat-sided face by a focused optical pump source having a beam height at said polished face approximately equal to the designed laser mode diameter of an intracavity laser beam;
said laser material has an absorption length for the focused optical pump source approximately equal to the radius of the designed laser mode;
said focused optical source provides a convergent pump beam upon entering said laser material;
a resonant cavity axis is folded by internal reflection within the said laser material, with a fold angle having an apex at a center of said pumped face and an angle of between 20 and 160 degrees; and
said side-pumping geometry is such that transverse gain distribution, integrated along said resonant optical cavity axis, has a nearly circular profile symmetry.

10. The laser of claim 9 wherein said active modulator is an electro-optic modulator.

11. A Q-switched solid stale laser comprising:
a laser material in a resonant optical cavity;
a Q-switched device comprising an active modulator capable of producing optical loss at a controlled rate and a saturable absorber within said resonant optical cavity, said saturable absorber selected such that a ratio of normalized fluence of the absorber to normalized fluence of the gain medium falls with the range of 0.1 to 1.0 and said saturable absorber selected and arranged such that a change in refractive index of said saturable absorber during pulse rise time results in a frequency chirp of the fundamental mode sufficient to reduce mode-beating noise.

12. The Q-switched device according to claim 11, wherein said active modulator is an acousto-optic modulator.

13. The Q-switched device according to claim 11, wherein said active modulator is an acousto-optic modulator.

14. The Q-switched device of claim 11 wherein said saturable absorber is a Cr4+:YAG.

15. The Q-switched device of claim 11 wherein said active modulator is spaced from said saturable absorber.

16. The laser of claim 11 wherein said frequency chirp of the fundamental mode is of the order of at least a few times the free-spectral-range of said resonant optical cavity.

17. The laser of claim 11 wherein said saturable absorber has a thickness of between one to ten millimeters.

18. A Q-switched solid state laser comprising:
a laser material in a resonant optical cavity;
a Q-switched device comprising an active modulator capable of producing optical loss at a controlled rate and a saturable absorber within said resonant optical cavity, said saturable absorber selected such that a ratio of normalized fluence of the absorber to normalized fluence of the gain medium falls with the range of 0.1 to 1.0 and said saturable absorber selected and arranged such that a change in refractive index of said saturable absorber during pulse rise time results in a frequency chirp of the fundamental mode of the order of at least a few times the free-spectral-range of said resonant optical cavity.

19. The Q-switched laser of claim 18 wherein said saturable absorber has a thickness of between one to ten millimeters.

20. The laser of claim 11 wherein said saturable absorber is selected such that a ratio of normalized fluence of the absorber to normalized fluence of the gain medium falls with the range of 0.1 to 0.4.

21. The laser of claim 11 wherein said saturable absorber is selected such that a ratio of normalized fluence of the absorber to normalized fluence of the gain medium is about 0.2.

22. The laser of claim 18 wherein said saturable absorber is selected such that a ratio of normalized fluence of the absorber to normalized fluence of the gain medium falls with the range of 0.1 to 0.4.

23. The laser of claim 18 wherein said saturable absorber is selected such that a ratio of normalized fluence of the absorber to normalized fluence of the gain medium is about 0.2.

* * * * *